United States Patent
Dierksmeier (10) Patent No.: US 9,638,056 B2
(45) Date of Patent: May 2, 2017

(54) GAS TURBINE ENGINE AND ACTIVE BALANCING SYSTEM

(71) Applicant: Rolls-Royce North American Technologies, Inc., Indianapolis, IN (US)

(72) Inventor: Douglas D. Dierksmeier, Franklin, IN (US)

(73) Assignee: Rolls-Royce North American Technologies, Inc., Indianapolis, IN (US)

( * ) Notice: Subject to any disclaimer, the term of this patent is extended or adjusted under 35 U.S.C. 154(b) by 464 days.

(21) Appl. No.: 14/096,672

(22) Filed: Dec. 4, 2013

(65) Prior Publication Data

US 2014/0260323 A1 Sep. 18, 2014

Related U.S. Application Data (60) Provisional application No. 61/777,976, filed on Mar. 12, 2013.

(51) Int. Cl.

| | | |
|---|---|---|
| *F01D 25/04* | (2006.01) | |
| *F01D 25/16* | (2006.01) | |
| *F16C 32/04* | (2006.01) | |
| *F01D 5/10* | (2006.01) | |
| *F01D 5/02* | (2006.01) | |

(52) U.S. Cl.
CPC .............. *F01D 25/04* (2013.01); *F01D 5/027* (2013.01); *F01D 5/10* (2013.01); *F16C 32/044* (2013.01); *F05D 2240/51* (2013.01); *F05D 2260/96* (2013.01); *F05D 2270/44* (2013.01); *Y02T 50/671* (2013.01)

(58) Field of Classification Search
CPC ....... F05D 2240/51–2240/515; F16C 2360/23; F02C 7/06
See application file for complete search history.

(56) References Cited

U.S. PATENT DOCUMENTS

| | | | |
|---|---|---|---|
| 4,967,550 A | 11/1990 | Acton et al. | |
| 5,202,824 A * | 4/1993 | Chen .................. | F16C 32/0493 310/90.5 |
| 5,208,522 A | 5/1993 | Griepentrog et al. | |

(Continued)

FOREIGN PATENT DOCUMENTS

EP 0453179 A2 10/1991

OTHER PUBLICATIONS

Christopher A Gallo, Halbach Magnetic Rotor Development, Feb. 2008, NASA Technical Memo, http://ntrs.nasa.gov/archive/nasa/casi.ntrs.nasa.gov/20080013147.pdf.*

(Continued)

*Primary Examiner* — Nathaniel Wiehe
*Assistant Examiner* — Brian O Peters
(74) *Attorney, Agent, or Firm* — Barnes & Thornburg, LLP (57) ABSTRACT

The present disclosure provides, in one embodiment, a unique gas turbine engine. Other embodiments include unique gas turbine engines, and unique active balancing systems; as well as apparatuses, systems, devices, hardware, methods, and combinations for gas turbine engines and active balancing systems. Further embodiments, forms, features, aspects, benefits, and advantages of the present application will become apparent from the description and figures provided herewith.

20 Claims, 3 Drawing Sheets

(56) References Cited

U.S. PATENT DOCUMENTS

| | | | |
|---|---|---|---|
| 5,285,700 A | 2/1994 | Lau | |
| 5,300,843 A * | 4/1994 | Lyons | F16C 32/0482 |
| | | | 310/90.5 |
| 5,355,042 A | 10/1994 | Lewis et al. | |
| 5,490,759 A | 2/1996 | Hoffman | |
| 5,818,137 A * | 10/1998 | Nichols | F16C 32/0448 |
| | | | 310/178 |
| 6,378,293 B1 * | 4/2002 | Care | F01D 15/10 |
| | | | 310/90.5 |
| 7,371,042 B2 | 5/2008 | Lee | |
| 7,685,876 B2 | 3/2010 | Mollmann et al. | |
| 7,793,540 B2 | 9/2010 | Robbins | |
| 7,882,693 B2 * | 2/2011 | Schilling | F02C 3/107 |
| | | | 60/204 |
| 7,912,587 B2 | 3/2011 | Walters et al. | |
| 8,015,879 B2 | 9/2011 | Hall et al. | |
| 8,049,353 B1 | 11/2011 | Eng et al. | |
| 8,099,944 B2 | 1/2012 | Foster et al. | |
| 8,186,168 B2 | 5/2012 | Heathco | |
| 8,322,991 B2 | 12/2012 | MacFarlane et al. | |
| 8,388,303 B2 * | 3/2013 | Weidmann | F01D 5/025 |
| | | | 415/111 |
| 8,647,049 B2 | 2/2014 | Evans et al. | |
| 2012/0102701 A1 | 5/2012 | Borufka et al. | |

OTHER PUBLICATIONS

International Search Report and Written Opinion dated Oct. 10, 2014, relating to International Application No. PCT/US2013/073051, 10 pages.

\* cited by examiner

GAS TURBINE ENGINE AND ACTIVE BALANCING SYSTEM

CROSS REFERENCE TO RELATED APPLICATIONS

This application claims priority to and the benefit of U.S. Provisional Patent Application No. 61/777,976, filed 12 Mar. 2013, the disclosure of which is now expressly incorporated herein by reference.

FIELD OF THE DISCLOSURE

The present disclosure relates to gas turbine engines. More particularly, the present disclosure relates to active balancing systems and gas turbine engines having active balancing systems.

BACKGROUND

Balancing systems for gas turbine engines remain an area of interest. Some existing systems have various shortcomings, drawbacks, and disadvantages relative to certain applications. Accordingly, there remains a need for further contributions in this area of technology.

SUMMARY

One embodiment of the present disclosure is a unique gas turbine engine. Other embodiments include unique gas turbine engines, and unique active balancing systems; as well as apparatuses, systems, devices, hardware, methods, and combinations for gas turbine engines and active balancing systems. Further embodiments, forms, features, aspects, benefits, and advantages of the present application will become apparent from the description and figures provided herewith.

BRIEF DESCRIPTION OF THE DRAWINGS

The description herein makes reference to the accompanying drawings wherein like reference numerals refer to like parts throughout the several views, and wherein.

DETAILED DESCRIPTION

For purposes of promoting an understanding of the principles of the disclosure, reference will now be made to the embodiments illustrated in the drawings, and specific language will be used to describe the same. It will nonetheless be understood that no limitation of the scope of the disclosure is intended by the illustration and description of certain embodiments of the disclosure. In addition, any alterations and/or modifications of the illustrated and/or described embodiment(s) are contemplated as being within the scope of the present disclosure. Further, any other applications of the principles of the disclosure, as illustrated and/or described herein, as would normally occur to one skilled in the art to which the disclosure pertains, are contemplated as being within the scope of the present disclosure.

Figure 1:
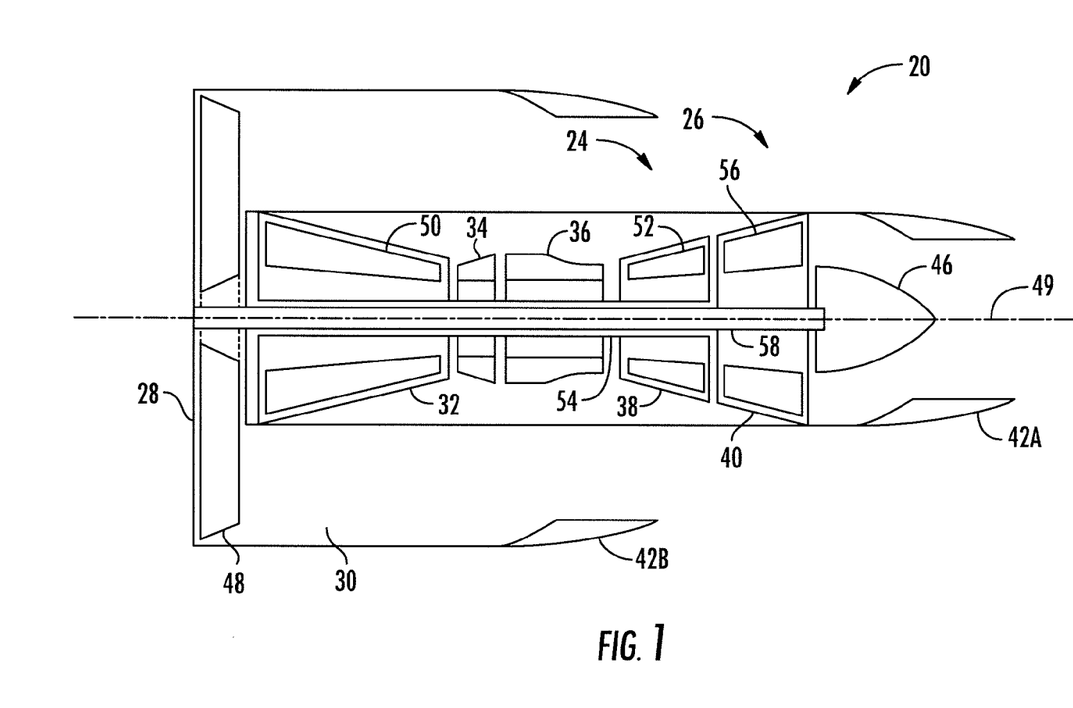
FIG. 1 schematically illustrates some aspects of a non-limiting example of a gas turbine engine in accordance with an embodiment of the present disclosure.

Referring to the drawings, and in particular FIG. 1, there are illustrated some aspects of a non-limiting example of a gas turbine engine 20 in accordance with an embodiment of the present disclosure. In one form, engine 20 is a propulsion engine, e.g., an aircraft propulsion engine. In other embodiments, engine 20 may be any other type of gas turbine engine, e.g., a marine gas turbine engine, an industrial or power generation gas turbine engine, or any aero, aero-derivative or non-aero derivative gas turbine engine. In one form, engine 20 is a two spool engine having a high pressure (HP) spool 24 and a low pressure (LP) spool 26. In other embodiments, engine 20 may include only a single spool, or may include three or more spools, e.g., may include an intermediate pressure (IP) spool and/or other spools and/or partial spools, e.g., on-axis or off-axis compressor and/or turbine stages (i.e., stages that rotate about an axis that is the same or different than that of the primary spool(s)). In one form, engine 20 is a turbofan engine. In other embodiments, engine 20 may be any other type of gas turbine engine, such as a turboprop engine, a turboshaft engine, a propfan engine, a turbojet engine or a hybrid or combined cycle engine. As a turbofan engine, LP spool 26 is operative to drive a propulsor 28 in the form of a turbofan (fan) system, which may be referred to as a turbofan, a fan, or a fan system. As a turboprop engine, LP spool 26 powers a propulsor 28 in the form of a propeller system (not shown), e.g., via a reduction gearbox (not shown). As a propfan engine, LP spool 26 powers a propulsor 28 in the form of a propfan. In other embodiments, propulsor 28 may take other forms, such as one or more helicopter rotors or tilt-wing aircraft rotors, for example, powered by one or more engines 20 in the form of one or more turboshaft engines.

In one form, engine 20 includes, in addition to fan 28, a bypass duct 30, a compressor 32, a diffuser 34, a combustor 36, a high pressure (HP) turbine 38, a low pressure (LP) turbine 40, a nozzle 42A, a nozzle 42B, and a tailcone 46, which are generally disposed about and/or rotate about an engine centerline 49. In other embodiments, there may be, for example, an intermediate pressure spool having an intermediate pressure turbine or other turbomachinery components, such as those mentioned above. In one form, engine centerline 49 is the axis of rotation of fan 28, compressor 32, turbine 38, and turbine 40. In other embodiments, one or more of fan 28, compressor 32, turbine 38, and turbine 40 may rotate about a different axis of rotation.

In the depicted embodiment, engine 20 core flow is discharged through nozzle 42A, and the bypass flow from fan 28 is discharged through nozzle 42B. In other embodiments, other nozzle arrangements may be employed, e.g., a common nozzle for core and bypass flow; a nozzle for core flow, but no nozzle for bypass flow; or another nozzle arrangement. Bypass duct 30 and compressor 32 are in fluid communication with fan 28. Nozzle 42B is in fluid communication with bypass duct 30. Diffuser 34 is in fluid communication with compressor 32. Combustor 36 is fluidly disposed between compressor 32 and turbine 38. Turbine 40 is fluidly disposed between turbine 38 and nozzle 42A. In one form, combustor 36 includes a combustion liner (not shown) that contains a continuous combustion process. In other embodiments, combustor 36 may take other forms, and may be, for example, a wave rotor combustion system, a rotary valve combustion system, a pulse detonation combustion system, a continuous detonation combustion system, and/or a slinger combustion system, and may employ deflagration and/or detonation combustion processes.

Fan system 28 includes a fan rotor system 48 driven by LP spool 26. In various embodiments, fan rotor system 48 may include one or more rotors (not shown) that are powered by turbine 40. In various embodiments, fan 28 may include one or more fan vane stages (not shown in FIG. 1) that cooperate with fan blades (not shown) of fan rotor system 48 to compress air and to generate a thrust-producing flow. Bypass duct 30 is operative to transmit a bypass flow generated by fan 28 around the core of engine 20. Compressor 32 includes a compressor rotor system 50. In various embodiments, compressor rotor system 50 includes one or more rotors (not shown) that are powered by turbine 38. Compressor 32 also includes a plurality of compressor vane stages (not shown in FIG. 1) that cooperate with compressor blades (not shown) of compressor rotor system 50 to compress air. In various embodiments, the compressor vane stages may include a compressor discharge vane stage and/or one or more diffuser vane stages. In one form, the compressor vane stages are stationary. In other embodiments, one or more vane stages may be replaced with one or more counter-rotating blade stages.

Turbine 38 includes a turbine rotor system 52. In various embodiments, turbine rotor system 52 includes one or more rotors having turbine blades (not shown) operative to extract power from the hot gases flowing through turbine 38 (not shown), to drive compressor rotor system 50. Turbine 38 also includes a plurality of turbine vane stages (not shown) that cooperate with the turbine blades of turbine rotor system 52 to extract power from the hot gases discharged by combustor 36. In one form, the turbine vane stages are stationary. In other embodiments, one or more vane stages may be replaced with one or more counter-rotating blade stages. Turbine rotor system 52 is drivingly coupled to compressor rotor system 50 via a shafting system 54. Turbine 40 includes a turbine rotor system 56. In various embodiments, turbine rotor system 56 includes one or more rotors having turbine blades (not shown) operative to drive fan rotor system 48. Turbine 40 also includes a plurality of turbine vane stages (not shown in FIG. 1) that cooperate with the turbine blades of turbine rotor system 56 to extract power from the hot gases discharged by turbine 38. In one form, the turbine vane stages are stationary. In other embodiments, one or more vane stages may be replaced with one or more counter-rotating blade stages. Turbine rotor system 56 is drivingly coupled to fan rotor system 48 via a shafting system 58. In various embodiments, shafting systems 54 and 58 include a plurality of shafts that may rotate at the same or different speeds and directions for driving fan rotor system 48 rotor(s) and compressor rotor system 50 rotor(s). In some embodiments, only a single shaft may be employed in one or both of shafting systems 54 and 58. Turbine 40 is operative to discharge the engine 20 core flow to nozzle 42A.

During normal operation of gas turbine engine 20, air is drawn into the inlet of fan 28 and pressurized. Some of the air pressurized by fan 28 is directed into compressor 32 as core flow, and some of the pressurized air is directed into bypass duct 30 as bypass flow. Compressor 32 further pressurizes the portion of the air received therein from fan 28, which is then discharged into diffuser 34. Diffuser 34 reduces the velocity of the pressurized air, and directs the diffused core airflow into combustor 36. Fuel is mixed with the pressurized air in combustor 36, which is then combusted. The hot gases exiting combustor 36 are directed into turbines 38 and 40, which extract energy in the form of mechanical shaft power to drive compressor 32 and fan 28 via respective shafting systems 54 and 58. The hot gases exiting turbine 40 are discharged through nozzle system 42A, and provide a component of the thrust output by engine 20.

During operation, engine 20 may experience vibration resulting from one or more causes, such as rotor component imbalance, rotor assembly imbalance, uneven wear of one or more components, material deposition on one or more components, operation in a bend mode or other vibratory mode, induced vibration from other sources, e.g., other rotors, and other causes. In many circumstances, the vibration may be reduced by balancing all or a portion of the rotating components, e.g., rotors, or engine 20. It is desirable to operate engine 20 with as little vibration as practicable. Accordingly, embodiments of the present disclosure include means for balancing a rotating machine, such as all or a portion of engine 20 or any other machine having one or more rotating components. In some embodiments, the means for balancing operates on the fly, that is, performing balancing of engine 20 or components thereof during the operation of engine 20, including in-service operation such as in-flight and/or ground operation of normal commercial passenger and/or cargo transport aircraft, fighter aircraft, helicopter, and/or other aircraft-type operations. In some embodiments, the means for balancing may also be employed to generate electrical power.

Figure 2:
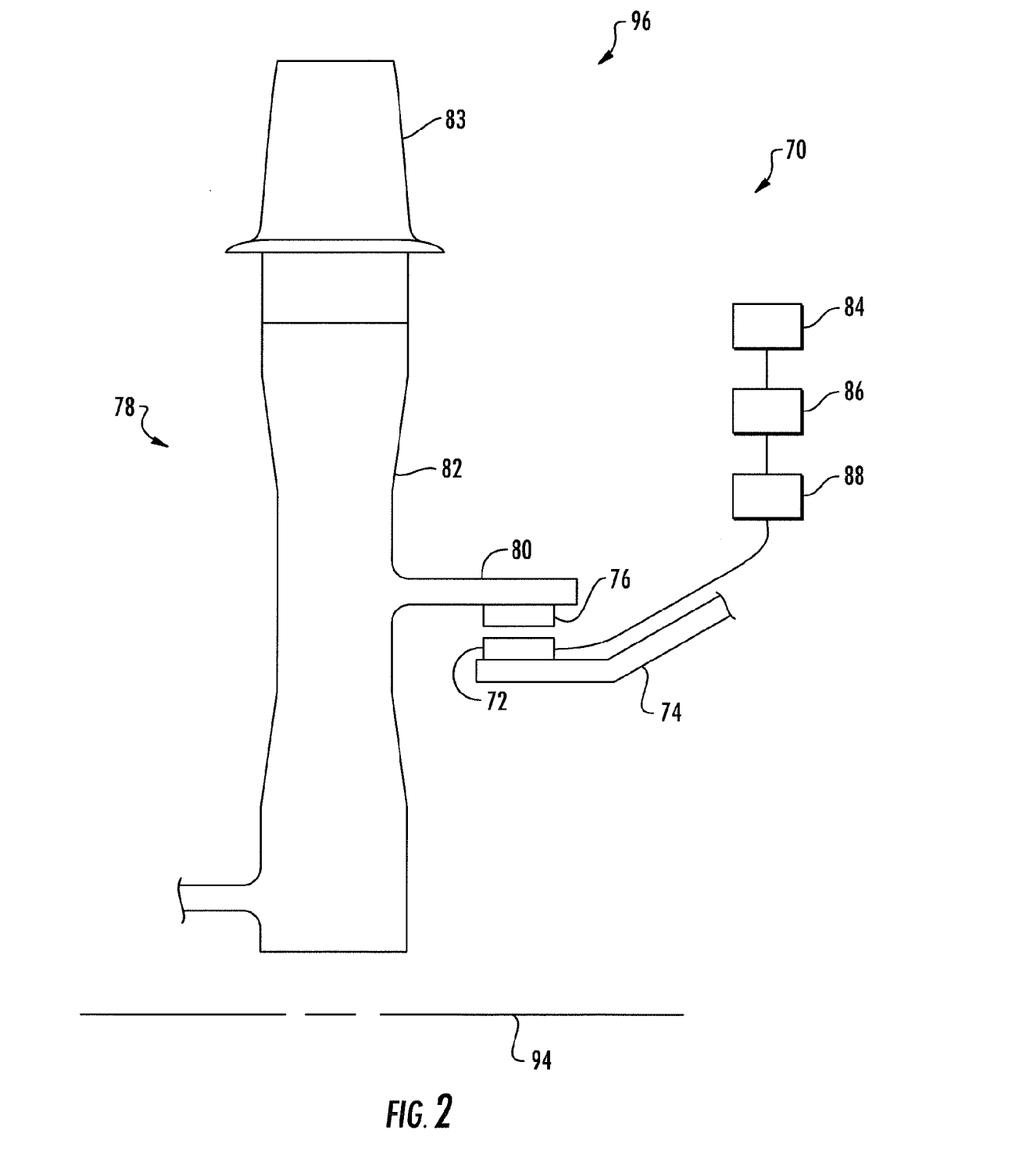
FIG. 2 schematically illustrates some aspects of a non-limiting example of a balancing system in accordance with an embodiment of the present disclosure, wherein the balancing system is employed in conjunction with a turbine rotor disk.
Figure 3:
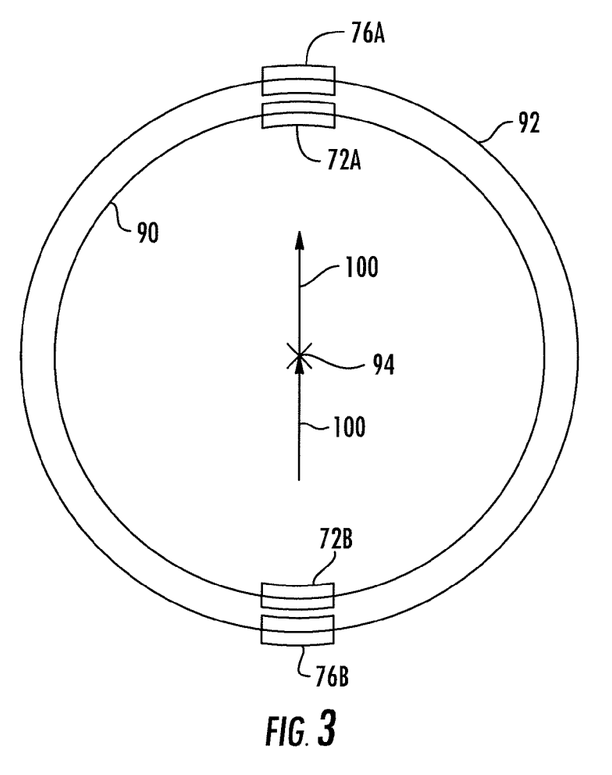
FIG. 3 schematically illustrates some aspects of a non-limiting example of a balancing system in accordance with an embodiment of the present disclosure, and illustrates an example of a plurality of magnetic elements that may be activated to reduce or eliminate vibration in a rotor system and/or rotor system component.
Figure 4:
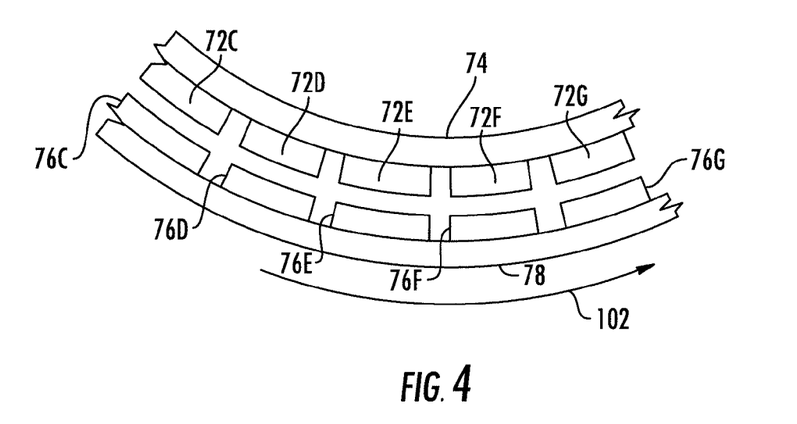
FIG. 4 schematically illustrates some aspects of a non-limiting example of a balancing system in accordance with an embodiment of the present disclosure, and illustrates an example of magnetic elements interacting to reduce an unbalance in a particular direction.

Referring to FIGS. 2, 3, and 4, some aspects of a balancing system 70 configured to balance at least a portion of a rotating machine (i.e., a machine having one or more rotating components), such as all or a portion of engine 20, which may include all or a portion of fan rotor system 48 (for engines so equipped), compressor rotor system 50, and/or turbine rotor system 52 in accordance with an embodiment of the present disclosure are schematically illustrated. In one form, balancing system 70 is considered a part of engine 20. In other embodiments, balancing system 70 may be considered a part of another rotating machine, for example, another turbomachinery device or system, or other another type of rotating machine. Balancing system 70 is an active balancing system that is configured to balance at least a portion or component of the rotating machine, e.g., engine 20, during operation of the rotating machine, e.g., normal operation. Balancing system 70 includes a plurality of magnetic elements 72 affixed to a static engine component 74; a plurality of magnetic elements 76 affixed to a rotor component 78, for example, but not limited to an arm 80 extending from a turbine rotor disk 82 to which a plurality of turbine blades 83 are coupled; a vibration sensor 84; a controller 86; and a power supply 88.

In one form, magnetic elements 72 are electromagnets. In other embodiments, magnetic elements 72 may be permanent magnets, or may be formed of a magnetic material, such as a ferromagnetic material, but without being electromagnets or permanent magnets. Although the present embodiments include a plurality of magnetic elements 72, some embodiments may employ only a single magnetic element 72.

Static engine component 74 may be any stationary component of engine 20, for example, a static seal component, an engine case structure and/or a static component dedicated for use in balancing system 70, or any other static component of a gas turbine engine or other machine having one or more rotating components. Magnetic elements 72 are distributed along a 360 degrees arc 90 on static engine component 74. In one form, magnetic elements 72 are evenly spaced circumferentially along arc 90. In other embodiments, other spacing distributions may be employed. In FIG. 3, only two magnetic elements 72 and two magnetic elements 76 are illustrated for purposes of clarity, although it will be understood that any number of magnetic elements 72 and magnetic elements 76 may be employed. Some embodiments may employ the same number of magnetic elements 72 as the number of magnetic elements 76. Other embodiments may employ a different number of magnetic elements 72 than the number of magnetic elements 76.

In one form, magnetic elements 76 are permanent magnets. In other embodiments, magnetic elements 76 may be electromagnets, or may be formed of a magnetic material, such as a ferromagnetic material, but without being electromagnets or permanent magnets. Although the present embodiments include a plurality of magnetic elements 76, some embodiments may employ only a single magnetic element 76. In one form, magnetic elements 76 are evenly spaced circumferentially along 360 degrees arc 92. In other embodiments, other spacing distributions may be employed. Magnetic elements 72 and 76 are disposed to be positioned opposite each other for at least one point during the rotation of rotor component 78. In one form, magnetic elements 72 are disposed radially inward of magnetic elements 76. In other embodiments, magnetic elements 72 may be disposed radially outward of magnetic elements 76 in addition to or in place of being disposed radially inward of magnetic elements 76, and/or may be disposed axially opposite magnetic elements 72, e.g., at the same or similar radial position. In still other embodiments, any relative positional arrangement between magnetic elements 72 and magnetic elements 76 may be employed.

Rotor component 78 is configured to rotate about an axis 94. In one form, rotor component 78 is a component of a turbine rotor 96, which may be all or a portion of turbine rotor system 52. In other embodiments, rotor component 78 may be all or a portion of fan rotor system 48 (for engines so equipped), compressor rotor system 50, and/or another rotor system in engine 20. In still other embodiments, rotor component 78 may be a rotor component of another type of turbomachine or other rotary machine. In one form, rotor component 78 includes arm 80 and turbine rotor disk 82. In other embodiments, rotor component 78 may not be or include an arm or rotor disk such as arm 80 and turbine rotor disk 82.

Vibration sensor 84 is configured to sense vibration in engine 20. In particular, vibration sensor 84 is configured to sense rotational vibration in engine 20, i.e., vibration stemming from imbalance in one or more rotating components of engine 20. In one form, vibration sensor 84 is an accelerometer. In other embodiments, other types of vibration sensors may be employed, for example and without limitation, any piezoelectric sensor, an optical sensor and/or other sensor types. In one form, vibration sensor 84 is configured to sense vibration in a plurality of directions. In other embodiments, vibration sensor 84 may be configured to sense vibration in only a single direction. In one form, vibration sensor 84 is a discreet device, e.g., located at a particular position on a static component of engine 20. In other embodiments, sensor 84 may be located on a rotating component or system. In still other embodiments, sensor 84 may be formed of more than one discreet component, e.g., discreet or other sensor components located at one or more positions on a static and/or rotating component or system of engine 20.

Controller 86 is communicatively coupled to vibration sensor 84, and is operative to receive vibration data from vibration sensor 84. In one form, controller 86 is configured to execute program instructions to selectively activate one or more magnetic element(s) 72 selectively attract and/or repel the magnetic element(s) 72 to and/or from one or more magnetic elements 76 in order to shift the position of all or a portion of the rotor, e.g., rotor component 78, by a small amount, locally (e.g., at one or more desired locations on the rotor or rotor component), and thereby reduce the vibration in engine 20. In various embodiments, controller 86 may be configured to execute program instructions to activate one or more of magnetic element(s) 72 and/or one or more of magnetic element(s) 76 to selectively attract one to the other or both to each other, and/or to selectively repel one from the other or both from each other, to reduce the vibration that stems from rotation of the rotor.

In one form, controller 86 is microprocessor based and the program instructions are in the form of software stored in a memory (not shown). However, it is alternatively contemplated that the controller and program instructions may be in the form of any combination of software, firmware, and hardware, including state machines, and may reflect the output of discreet devices and/or integrated circuits, which may be co-located at a particular location or distributed across more than one location, including any digital and/or analog devices configured to achieve the same or similar results as a processor-based controller executing software or firmware based instructions.

Power supply 88 is electrically coupled to both controller 86 and to magnetic elements 72. Power supply 88 is configured to selectively supply electrical power to one or more individual magnetic elements 72 and/or one or more groups of magnetic elements 72 under the direction of controller 86, i.e., to selectively supply or not supply electrical power to any one or more magnetic elements 72 under the direction of controller 86. In some embodiments, power may be likewise supplied to one or more magnetic elements in addition to or in place of magnetic elements 72, e.g., via a built-in rotor alternator and/or generator, controller and vibration sensor. In some embodiments, magnetic elements 72 and 76 may also or alternatively be configured to generate electrical power upon the rotation of rotor component 78. In one form, magnetic elements 72 and 76 are configured to form a permanent magnet alternator. In other embodiments, magnetic elements 72 and 76 may be configured to form one or more other types of alternators and/or generators. In embodiments where magnetic elements 72 and 76 are configured to generate electrical power, power supply 88 may include one or more power conditioning devices for conditioning the power received via magnetic elements 72 (and/or magnetic elements 76) for use by another engine 20 components or non-engine 20 component).

During operation, magnetic elements 76 rotate through arc 92 in close proximity to magnetic elements 72 disposed about arc 90. In this regard, "close proximity" is the proximity that is sufficient for interaction between magnetic elements 72 and magnetic elements 76 to a degree that allows a reduction in vibration, and in some embodiments, the generation of electrical power. The proximity requirement will vary in accordance with one or more parameters, such as the magnetic field strength of the magnetic elements, the stiffness and/or mass of the rotor, and other potential factors not mentioned herein. The proximity requirement is readily determined via manual calculations, two and/or three dimensional electronic modeling, and/or simple experimentation by those of ordinary skill in the art. During the rotation of rotor 96, its vibration, e.g., absolute or above a desired threshold, is sensed by sensor 84. Sensor 84 provides a signal, e.g., proportional to the vibration or otherwise representative of the vibration, to controller 86. Controller 86 is configured to resolve the sensor 84 vibration data into one or more vibration magnitude and one or more vibration directions, e.g., such as imbalance loads stemming, such as a simple mass imbalance load having a direction that rotates with the rotor 96 and rotor component 78. In other embodiments, controller 86 may be configured to resolve data from imbalance such as an imbalance stemming from an orbital displacement of rotor 96, an imbalance resulting from a bend mode or other vibratory mode of rotor 96 and/or another rotor, and/or other sources of vibration. The resolution performed by controller 86 may yield one or more imbalance loads at one or more rotating directions and at one or more speeds of rotation. Controller 86 is configured to direct power supply 88 to supply power to selected magnetic elements 72 (based on the unbalance load magnitude, direction and speed) in order to selectively attract and repel magnetic elements 76 to and from selected magnetic elements 72 so as to reduce the vibration by deflecting rotor component 78 in a direction opposite to the unbalance load. For example, in the depiction of FIG. 3, an unbalance load direction 100 is detected, which represents the direction of the unbalance load in rotor component 78 at an instantaneous point in time during the rotation of rotor 96 and rotor component 78. Controller 86 is configured to execute program instructions to direct power supply 88 to supply power in one direction or polarity, e.g., a positive voltage, to magnetic element 72A, to attract magnetic element 72A to magnetic element 76A in order to reduce the vibration. Controller 86 is also configured to execute program instructions to direct power supply 88 to supply power in the opposite direction or polarity, e.g., a negative voltage, to magnetic element 72B to repel magnetic element 72B from magnetic element 76B. By doing so, the center of mass of rotor 96, e.g., of rotor component 78, is shifted in the opposite direction of the unbalance load, thereby reducing the unbalance load. As rotor 96 continues to rotate, the direction of the unbalance load rotates with it. In one form, controller 86 is configured to execute program instructions to power other magnetic elements 72 e.g., circumferentially subsequent to magnetic elements 72A and 72B and/or other magnetic elements that are disposed in the direction of the unbalance load. For example, in the depiction of FIG. 4, assuming a direction of rotation indicated by arrow 102, controller 86 would execute program instructions to direct power supply 88 to power magnetic element 72C, then magnetic element 72D, then magnetic element 72E, then magnetic element 72F, then magnetic element 72G and so on, to generate attraction and/or repulsion with corresponding magnetic elements 76A-76G and so on, depending on the unbalance load direction, to yield a rotational speed of the actuation of the magnetic elements 72 that matches the rotational speed of rotor 96 and/or the rotational speed(s) of the imbalance(s) if different than the rotational speed of rotor 96, thereby reacting against the unbalance load as the unbalance load rotates with rotor 96. In other embodiments, controller 86 may be configured to direct power supply 88 to activate magnetic elements 72 at a different rate and/or in a different direction to cause magnetic attraction and/or repulsion in the imbalance direction or in more than one imbalance direction, e.g., in the event rotor 96 is exhibiting an orbital vibration mode or is experiencing a rotating unbalance load that rotates at a different speed than the rotation speed of rotor 96, or is experiencing multiple imbalance loads that have one or more different directions.

In one form, controller 86 includes feedback loop control algorithms configured to achieve and maintain a desired vibration level, e.g., below a selected value. In various embodiments, control algorithms may include proportional, integral, and/or derivative control and/or other feedback loop control functions and/or non-feedback control algorithms configured to achieve and maintain a desired vibration level. Although the embodiment described herein employs both magnetic attraction and magnetic repulsion as between magnetic elements 72 and magnetic elements 76 in order to reduce vibration, other embodiments may employ only magnetic attraction or magnetic repulsion. By attracting and/or repelling magnetic elements 72 and 76, e.g., when opposite each other in the direction of the unbalance load, the relative position of rotor component 78 can be adjusted during the rotation rotor 96 in order to balance the rotor and reduce or eliminate the vibration.

In some embodiments, the relative rotation between magnetic elements 72 and magnetic elements 76 may be employed to generate electrical power in magnetic elements 72, e.g., in the form of a permanent magnet alternator or an inductive generator or other type of alternator or generator. In some embodiments, electrical power generated in magnetic elements 72 may be controlled by controller 86 and power supply 88, which may also include power conditioning electronics (not shown) or which may direct the generated power to power conditioning electronics for subsequent use by engine 20, an airframe, or any electrical device or system.

Embodiments of the present disclosure include a gas turbine engine comprising a compressor, a combustor in fluid communication with the compressor; a turbine in fluid communication with the combustor; and an active balancing system configured to balance at least a portion of the gas turbine engine during operation of the gas turbine engine. The active balancing system includes a static engine component having a first magnetic element, a rotor component operative to rotate about an axis, a vibration sensor, and a controller. The rotor component has a second magnetic element. The second magnetic element and the first magnetic element are disposed to be positioned opposite each other at one point during a rotation of the rotor component. The vibration sensor is configured to sense a vibration in the gas turbine engine. The controller is configured to execute program instructions to activate one or both of the first magnetic element and the second magnetic to selectively attract one to the other and/or to selectively repel one from the other element based on an output of the vibration sensor to reduce the vibration.

In a refinement, the controller is configured to execute program instructions to activate one or both of the first magnetic element and the second magnetic element to selectively attract one to the other and to selectively repel one from the other. In another refinement, one or both of the first magnetic element and the second magnetic element is an electromagnet.

In yet another refinement, the first magnetic element or the second magnetic element is a permanent magnet. In still another refinement, one or both of the first magnetic element and the second magnetic element is formed of a ferromagnetic material, but is not an electromagnet or a permanent magnet.

In yet still another refinement, the gas turbine engine further comprises a plurality of first magnetic elements and a plurality of second magnetic elements. In a further refinement, the first magnetic element and the second magnetic element are configured to generate electrical power upon rotation of the rotor component.

In a yet further refinement, the first magnetic element and the second magnetic element are configured to form a permanent magnet alternator. In a still further refinement, the vibration sensor is an accelerometer.

Embodiments of the present disclosure include an active balancing system for a rotating machine comprising a static engine component including a first magnetic element, a rotor having a rotor component operative to rotate about an axis, a vibration sensor, and a controller. The rotor component includes a second magnetic element. The second magnetic element and the first magnetic element are disposed to be positioned opposite each other at one point during rotation of the rotor component. The vibration sensor is configured to sense a vibration associated with the rotor. The controller is configured to execute program instructions to activate one or both of the first magnetic element and the second magnetic element to selectively attract one to the other and/or selectively repel one from the other element based on an output of the vibration sensor to reduce the vibration.

In a refinement, the controller is configured to execute program instructions to activate one or both of the first magnetic element and the second magnetic element to selectively attract one to the other and to selectively repel one from the other. In another refinement, one or both of the first magnetic element and the second magnetic element is an electromagnet.

In yet another refinement, the first magnetic element or the second magnetic element is a permanent magnet. In still another refinement, one or both of the first magnetic element and the second magnetic element is formed of a ferromagnetic material, but is not an electromagnet or a permanent magnet.

In yet still another refinement, the active balancing system further comprises a plurality of first magnetic elements and a plurality of second magnetic elements. In a further refinement, the first magnetic element and the second magnetic element are configured to generate electrical power upon rotation of the rotor component.

In a yet further refinement, the first magnetic element and the second magnetic element are configured to form a permanent magnet alternator. In a still further refinement, the vibration sensor is an accelerometer.

Embodiments of the present disclosure include a gas turbine engine, comprising a compressor, a combustor in fluid communication with the compressor, a turbine in fluid communication with the combustor, and means for actively balancing at least a portion of the gas turbine engine during operation of the gas turbine engine. In a refinement, the means for actively balancing includes a controller configured to execute program instructions to activate at least one magnetic element.

While the disclosure has been described in connection with what is presently considered to be the most practical and preferred embodiment, it is to be understood that the disclosure is not to be limited to the disclosed embodiment(s), but on the contrary, is intended to cover various modifications and equivalent arrangements included within the spirit and scope of the appended claims, which scope is to be accorded the broadest interpretation so as to encompass all such modifications and equivalent structures as permitted under the law. Furthermore it should be understood that while the use of the word preferable, preferably, or preferred in the description above indicates that feature so described may be more desirable, it nonetheless may not be necessary and any embodiment lacking the same may be contemplated as within the scope of the disclosure, that scope being defined by the claims that follow. In reading the claims it is intended that when words such as "a," "an," "at least one" and "at least a portion" are used, there is no intention to limit the claim to only one item unless specifically stated to the contrary in the claim. Further, when the language "at least a portion" and/or "a portion" is used the item may include a portion and/or the entire item unless specifically stated to the contrary.

What is claimed is:

1. A gas turbine engine, comprising:
   a compressor;
   a combustor in fluid communication with the compressor;
   a turbine in fluid communication with the combustor; and
   an active balancing system configured to balance at least a portion of the gas turbine engine during operation of the gas turbine engine, including:
   a rotor component positioned in the turbine and coupled to a shaft of the gas turbine engine for rotation about an axis, the rotor component having a disk and an arm extending axially from the disk, a first magnetic element coupled to the arm and spaced apart from the shaft;
   a static engine component having a second magnetic element positioned radially inward of the first magnetic element and spaced apart from the shaft, wherein the second magnetic element and the first magnetic element are disposed to be positioned opposite each other at one point during a rotation of the rotor component;
   a vibration sensor configured to sense a vibration in the gas turbine engine; and
   a controller configured to execute program instructions to activate one or both of the first magnetic element and the second magnetic element to selectively attract one to the other or to selectively repel one from the other based on an output of the vibration sensor to reduce the vibration.

2. The gas turbine engine of claim 1, wherein the controller is configured to execute program instructions to activate one or both of the first magnetic element and the second magnetic element to selectively attract one to the other and to selectively repel one from the other.

3. The gas turbine engine of claim 1, wherein one or both of the first magnetic element and the second magnetic element is an electromagnet.

4. The gas turbine engine of claim 1, wherein the first magnetic element or the second magnetic element is a permanent magnet.

5. The gas turbine engine of claim 1, further comprising a plurality of first magnetic elements and a plurality of second magnetic elements.

6. The gas turbine engine of claim 1, wherein at least one of the first magnetic element and the second magnetic element are coupled to a power supply and configured to supply electrical power to the power supply upon rotation of the rotor component.

7. The gas turbine engine of claim 1, wherein the first magnetic element and the second magnetic element are configured to form a permanent magnet alternator coupled to a power supply and configured to supply electrical power to the power supply upon rotation of the rotor component.

8. The gas turbine engine of claim 1, wherein the vibration sensor is an accelerometer.

9. An active balancing system for a gas turbine engine, comprising:
- a rotor positioned in a turbine section of the gas turbine engine and having a rotor component coupled to a shaft for rotation about an axis, the rotor component including a disk and an arm extending axially from the disk, a first magnetic element coupled to the arm and spaced apart from the shaft;
- a static engine component including a second magnetic element positioned radially inward of the first magnetic element and spaced apart from the shaft, wherein the second magnetic element and the first magnetic element are disposed to be positioned opposite each other at one point during rotation of the rotor component;
- a vibration sensor configured to sense a vibration associated with the rotor; and
- a controller configured to execute program instructions to activate one or both of the first magnetic element and the second magnetic element to selectively attract one to the other or selectively repel one from the other based on an output of the vibration sensor to reduce the vibration.

10. The active balancing system of claim 9, wherein the controller is configured to execute program instructions to activate one or both of the first magnetic element and the second magnetic element to selectively attract one to the other and to selectively repel one from the other.

11. The active balancing system of claim 9, wherein one or both of the first magnetic element and the second magnetic element is an electromagnet.

12. The active balancing system of claim 9, wherein the first magnetic element or the second magnetic element is a permanent magnet.

13. The active balancing system of claim 9, further comprising a plurality of first magnetic elements and a plurality of second magnetic elements.

14. The active balancing system of claim 9, wherein at least one of the first magnetic element and the second magnetic element are coupled to a power supply and configured to supply electrical power to the power supply upon rotation of the rotor component.

15. The active balancing system of claim 9, wherein the first magnetic element and the second magnetic element are configured to form a permanent magnet alternator coupled to a power supply and configured to supply electrical power to the power supply upon rotation of the rotor component.

16. The active balancing system of claim 9, wherein the vibration sensor is an accelerometer.

17. A gas turbine engine, comprising:
- a compressor;
- a combustor in fluid communication with the compressor;
- a turbine in fluid communication with the combustor; and
- an active balancing system including:
- a vibration sensor,
- a first magnetic element coupled to a rotating engine component, the rotating engine component positioned in the turbine and including a disk and an arm extending axially from the disk, the first magnetic element coupled to the arm and spaced apart from a shaft of the gas turbine engine supporting the rotating engine component,
- a second magnetic element coupled to a static engine component radially inward of the first magnetic element and spaced apart from the shaft, and
- a controller configured to execute program instructions to activate at least one of the first and second magnetic elements based on an output of the vibration sensor as the second magnetic element passes over the first magnetic element during operation of the gas turbine engine.

18. The gas turbine engine of claim 17, wherein the first magnetic element and the second magnetic element are configured to form a permanent magnet alternator.

19. The gas turbine engine of claim 17, wherein one or both of the first magnetic element and the second magnetic element is an electromagnet.

20. The gas turbine engine of claim 17, wherein the first magnetic element or the second magnetic element is a permanent magnet.

* * * * *